(12) United States Patent
Bauer et al.

(10) Patent No.: US 7,793,920 B2
(45) Date of Patent: Sep. 14, 2010

(54) FENCING

(75) Inventors: Burkhard Bauer, Uchte (DE); Ole Skovmand, Montpellier (FR)

(73) Assignee: Vestergaard SA, Lausanne (CH)

( * ) Notice: Subject to any disclaimer, the term of this patent is extended or adjusted under 35 U.S.C. 154(b) by 1500 days.

(21) Appl. No.: 10/239,148

(22) PCT Filed: Jul. 5, 2002

(86) PCT No.: PCT/DK02/00466

§ 371 (c)(1),
(2), (4) Date: Jan. 16, 2003

(87) PCT Pub. No.: WO03/003827

PCT Pub. Date: Jan. 16, 2003

(65) Prior Publication Data

US 2004/0004210 A1    Jan. 8, 2004

(51) Int. Cl.
*E04H 17/04* (2006.01)
*A01N 25/08* (2006.01)

(52) U.S. Cl. .............................. 256/5; 256/45; 424/409; 424/411

(58) Field of Classification Search .................. 256/1, 256/5, 45; 43/107, 118, 131, 132.1–134; 424/403, 405, 409, 410, 411, DIG. 10, 412–419
See application file for complete search history.

(56) References Cited

U.S. PATENT DOCUMENTS

| | | | |
|---|---|---|---|
| 137,382 A | 4/1873 | Nagle | |
| 1,373,827 A | 4/1921 | Nelson et al. | |
| 3,643,371 A * | 2/1972 | Gordon | 43/107 |
| 4,079,700 A * | 3/1978 | Eshnaur et al. | |
| 4,237,113 A * | 12/1980 | Cardarelli | 424/419 |
| 4,286,772 A | 9/1981 | Parisien | |
| 4,305,243 A | 12/1981 | Yu | |
| 4,350,678 A | 9/1982 | Palvarini et al. | |
| 4,566,219 A | 1/1986 | Firth | |
| 5,048,551 A | 9/1991 | Schelfhaudt | |
| 5,170,584 A | 12/1992 | Perry | |
| 5,274,950 A | 1/1994 | Roberts | |
| 5,440,833 A | 8/1995 | Stoll | |
| 5,519,965 A | 5/1996 | Robinson | |
| 5,529,289 A | 6/1996 | Lancer, Sr. | |
| 5,948,832 A * | 9/1999 | Nagamatsu et al. | 424/411 |

(Continued)

FOREIGN PATENT DOCUMENTS

EP    0382382    8/1990

(Continued)

OTHER PUBLICATIONS

Colvin et al.; *Identifying control strategies for tomato leaf curl virus disease using an epidemiological model*; Journal of Applied Ecology; vol. 36; British Ecological Society; 1999; pp. 625-633.

*Primary Examiner*—Victor Macarthur
(74) *Attorney, Agent, or Firm*—James Creighton Wray; Meera P. Narasimhan (57) ABSTRACT

A fencing for preventing insects to enter an open air area comprising a substantially upright structure with a height suitable to prevent low flying insects to enter said open air area. The structure of the fencing is impregnated with an insecticide.

21 Claims, 2 Drawing Sheets

U.S. PATENT DOCUMENTS

2001/0048935 A1* 12/2001 Platts .................. 424/411
2003/0003126 A1* 1/2003 Mount et al. ............ 424/409

FOREIGN PATENT DOCUMENTS

| | | |
|---|---|---|
| GB | 1254369 | 11/1971 |
| GB | 2146882 | 5/1985 |
| GB | 2223921 | 4/1990 |
| GB | 2232052 | 5/1990 |
| WO | WO 98/18998 | 5/1998 |
| WO | WO 01/37662 | 5/2001 |

* cited by examiner

FENCING

FIELD OF THE INVENTION

The present invention relates to a fencing for preventing insects to enter an area. The invention also relates to use of such a fencing.

BACKGROUND OF THE INVENTION

In order to protect human beings and animals from diseases and annoying effects of nuisance insects, as for example bites or stings, a number of solutions have been developed throughout the years. One of the mostly known solutions is covering a certain area, for example the bed of a human being, by a mosquito net that prevents the person under the mosquito net from being bit by insects as mosquitoes or flies.

In U.S. Pat. No. 5,048,551, a special development within the field of protection of human beings against flying insects is disclosed, namely a floating insect screen for a user in a swimming pool. This insect screen has a base member connected to a number of upright members between which a mesh materials is attached preventing insects to reach the person under the floating insect screen.

In order to increase the efficiency of mosquito nets, it is known to impregnate the mesh material of the net with an insect repellent or even with insecticides to kill insects that touch the net structure. For people wearing clothes, also garments may be impregnated with insect repellents and/or insecticides as a protective agent.

Different agents to be used as insect repellents and insecticides are disclosed in international patent applications WO 98/18998 and WO 01/37662 and in European patent application EP 382 382 and references therein. Also disclosed in these patent applications and in references therein are water repellent agents, for example silicon oil or wax, to prevent washing off the insect repellent or insecticide and also UV-radiation protecting agents that prevent the insect repellent or insecticide from being decomposed due to UV-radiation.

Another attempt to reduce nuisance by insects is through killing of insects by air spraying, for example in insect breeding places. Air spraying of insecticides is furthermore used to reduce the effect of insects on agricultural fields.

Especially in tropical countries, a large number of insects, typically flying insects, causes substantial problems as vectors and transmitters of infectious diseases, as for example trypanosomiasis, affecting human beings and animals, why tremendous efforts have been concentrated in controlling these insects. However, especially for poorer countries, the expenses related to these efforts, especially the high price of insecticides, has a non-negligible influence on the economy of these countries. Using large amounts of insecticides by spraying over, for example agricultural fields, also may cause environmental problems. Further, it limits the possibilities for these countries to export their crops, since pesticide residues may be left on the crop and be detected by the authorities in importing countries. The European or North American farmer is confronted with the same problem of protecting versus retention of crop after spraying. When applying pesticides directly on crops, retention times must be respected, but this may be hard for farmers, especially when harvesting sorts of fruits and vegetables that are harvested over a period. By respecting retention time for ripening fruits, younger fruits risk to be damaged to a point that they can never be sold. In addition it implies the risk of resistance of the insects against the insecticide.

Regarding the fact that a large number of flying insects are a nuisance to human beings and animals either directly through insect attack or indirectly through agricultural effects caused by insects, it would be desirable to find a solution how to limit the negative influence of insects on daily life. Particularly, it would be desirable to find a solution to repel or kill insects that attempt to reach humans, animals or agricultural plants. Especially, it is interesting to prevent a contact between the insect and the host (human, animal or plant), since even a short contact time may be enough for the insect to damage the host. Insects carrying diseases may need only a few seconds after landing to damage the host. Treatment of walls in a house may thus well kill the mosquitoes, but the mosquitoes mostly rest on the walls after biting and have as such already transferred a disease. Aphids transferring opportunistic virus probe plants at landing and in this way transfer the virus. Both group of insects will land on a net that protects the host and even they may physically penetrate, they will already have received a dosage of insecticide that may disturb their behaviour and thus decrease their chance to transfer a disease.

DESCRIPTION/SUMMARY OF THE INVENTION

This object is achieved by a method for preventing low-flying insects to enter an open air area. Depending on the wherein the method comprises providing a fencing with a substantially upright structure at least partly surrounding the area, the structure having a height suitable to prevent low-flying insects to enter the open-air area, preferably a height of between 0.5 m and 2 m, wherein at least part of the structure is provided with an insecticide transferable to insects touching the at least part of the structure.

In order to understand and appreciate the functioning of this fencing, the following observations are essential. As intensive studies have revealed, the majority of flying nuisance insects, as for instance the tsetse fly, stomoxys or tabanids, are flying at a relatively low height, typically half a meter above ground. Thus, surrounding an open air area, for example an agricultural field or a children play ground, with a fencing, for example with a height of 1.5 meters, may prevent the low flying insects from reaching the open air area. This appealingly simple solution to a problem that has existed for thousands of years could only be found having knowledge of the behaviour of such nuisance insects.

The choice of the height of the fence, for example 1 m, 1.5 m or 2 m, may also take into consideration the presence of pollinating insects like honey bees that often have a higher flying height than pest insects. An optimal height thus considers as well target insects as non-target insects.

Insects meeting the fence in their normal flying height will often land on the net before flying on to the target or crawl through the holes. In order to prevent pest or nuisance insects after having touched the fence structure to fly to their target, at least part of the structure of a fencing according to the invention comprises an insecticide transferable to insects touching this part of a structure. In case, that the structure is a rigid wall or a sheet like a tarpaulin, the insecticide may be applied as a surface layer, or it may even be incorporated into the wall structure.

The advantage of a fencing according to the invention as compared to mosquito nets is that it is unnecessary to cover the area in order to prevent insects from entering. Even large areas as agricultural fields or villages may be surrounded by a fencing according to the invention requiring only relatively small amounts of material as compared to a complete covering of the area.

A fencing with an insecticide has the further advantage that insects already inside the area may reach and touch the fencing and receive insecticide which will reduce the density of insects in the area surrounded by the fencing.

In order to prevent insects that are crawling on the ground or boring through the soil, for example tipulid or scarabid larvae, from entering the area to be protected, the structure of the fencing may comprise a ground part which extends into the ground. This ground part may extend into the ground from a general structure of the fencing, but preferably it extends from a mesh into the ground. By extending into a certain depth into the ground, this ground part also prevents insects that are traversing the top soil from entering the area to be protected.

Typically however, it is not necessary that the fencing for use for such a method reaches the ground. This also implies an easier and cheaper mounting of the fencing. Therefore, preferably, the lower edge of the fencing is positioned at a certain distance, for example 5 cm to 20 cm, above the ground allowing crawling insects to pass the fencing. In fact, in some cases, it is highly desirable that crawling insects transverse the fencing, because spiders and certain beetles like carabid and carnivorous beetles are useful and desired inside the area. The insect control with a fence thus includes environmental considerations better than a plant covering spray application.

In its most simple version, the fencing according to the invention need not necessarily comprise an insecticide, though the use of such an insecticide increases the efficiency. Thus, a fencing having a substantially upright structure wherein the structure has a height suitable to prevent low flying insects to enter the open air area, preferably a height of between 0.5 m and 2 m, wherein the structure has a lower edge positioned at a certain height above ground, preferably between 5 cm and 20 cm above ground, for allowing crawling insects to pass the fencing and without an insecticide may as well serve the above mentioned purpose to a certain degree. In this case however, it is highly preferable that the fencing comprises a top part which is bent into a concave structure for trapping insects. Insects experiencing a blocking by the fencing on their flying path may try to fly up along the surface of the fencing in order to pass the obstacle. However, when reaching the bent top part, they will get trapped and finally die. In this case, use of insect attracting pheromones in the top part may be of advantage to increase the chance for trapping insects.

However, the highest benefit for a fencing according to the invention has been experienced by including an insecticide in at least part of the structure, the insecticide being transferable to insects touching this at least part of the structure.

An applicable insecticide may be based on pyrethroids, organophosphates, nicotinoids, neonicotinoids, pyridines, pyrimidin, pyrazoles, pyrrols, dialyl hydrazines, sulphonates, quinazolines, azomethines, trizines, benzoul-urea compounds, or carbamates. A number of possible agents are refereed in international patent applications WO 98/18998 and WO 01/37662 and in European patent application EP 382 382.

In a certain embodiment, such a fencing is a rigid, substantially upright structure of a certain height, for example one or two metres. The term substantially upright covers vertical fencing structures and structures that are inclined, without however thereby achieving a complete covering of the area. Thus, the area to be protected remains an open air area, only with a protecting fencing along the edge of the open air area and not covering the area. The fencing may be a rigid wall, for example made of wood, glass, metal or polymer.

Preferably however, such a fencing is achieved by rigid, substantially upright frame members, for example wooden poles, between which the protective structure, for example a non-rigid structure, for example a mesh, textile, or a foil is attached. As an alternative to a net structure, a perforated foil or laminate may be used as well. A suitable mesh structure could be the same as the one used for mosquito nets, which for example are used for covering windows or doors in buildings as a protective means against insects. Such a mesh may then have openings with a size that prevent the low flying insects from easily going through the mesh. But, even with quite large holes as compared to the insect, most insects will intercept the net and use it for a resting place. When provided with an insecticide, the net may an effective tool even in the case where insects easily may penetrate it.

A structure for a fencing according to the invention as a mesh, a textile, or a laminate may comprise man made fibres as well as natural fibres, for example viscose, cotton, glass fibres, polymer fibres, for example made of polyvinylchloride (PVC), polyester, polyethylene, polystyrene, polyoxyethylenes, polypropylene, polyamides or nylon, and mixtures or copolymers including these materials.

The material of the structure may be impregnated or surface treated with an insecticide or the insecticide may be incorporated into the material of the structure. How such an impregnation or incorporation of the insecticide may be achieved is generally described in prior art, for instance for a polyester net in international patent application WO 01/37662. It is an advantage, if the insecticide in the fencing structure is comprised at least partly inside the structure and gradually migrates to the surface of the structure, such that insecticide transfer to insects touching the structure is possible for an appreciable time, preferably several years.

However, in certain special applications, a short lifetime of the insecticide may be preferred. Especially, when, at a later stage, the structure is removed and destroyed, it is desirable that the lifetime of the insecticide has been short.

In principle, a fencing according to invention could be arranged as a floating fencing on water, which would be usable to protect people or animals in a water environment, for example a swimming pool or an outdoor playground in the water at the beach. Preferably however, the fencing according to the invention is supported on solid grounds.

In case an insect flies into the structure of the fencing, for instance a mesh structure, the insect may try to fly along the structure of the fencing in an upwards direction for bypassing the obstacle. Taking this fact into account, the structure in a further development has a top part comprising an insecticide. The effect of this trapping part may be increased by incorporating arrestant types of chairomones (chemical used in insect communication), attractants or pheromones. This is yet another way to improve the selectivity of the fence between pest and non-pest insects.

The top part may advantageously be bent for trapping those insects that move upwards along the surface of the structure. As an insect moves upwards along the structure, it will at some point be trapped in the bent part and touch this bent top part, whereby insecticide is transferred to the insect. In this case, it may be advantageous that an insect attracting agent, for example pheromones or lures, is used in the bended part to improve the efficacy as a trap.

In the further embodiment, the top part may comprise an insecticide which is different from the rest of the structure. For example, insects that have become resistant to the insecticide of the mesh may nevertheless be killed in case that they touch the top part of the fencing. The combination of two insecticides in separate parts of the structure may also be regarded as a mechanism to prevent or delay the onset of resistance to both insecticides when not already present.

As the fencing according to the invention is used in open air, it is important that the insecticide is not washed off the structure, and furthermore the insecticide should be prevented from being degraded due to UV-radiation. Both problems are dealt with for a polyester structure in international application WO 01/37662 and references therein such that also this problem is solved by combination of prior art knowledge with the fencing according to the invention. Protection can be achieved with a suitable covering of the surface, an impregnation with or an integration of an insecticide migrating agent.

In fact, by using a fencing with a top part that bends, for example with an approximately circular bending, insects that touch the structure and then fly upwards may be trapped in the top part and die therein. This is the more efficient if an insect attracting agent, for example pheromones and lures, are used in the bended part to improve the efficacy as a trap. In this case, a structure of a fencing to be efficient does not even need an insecticide or. Thus in certain cases, for a number of insects, an open air area may be kept free from flying insects by surrounding the open air area with a fencing that has a bent top part, where the top part acts as a trap.

Preferably the structure according to the invention is impregnated or covered with an agent that protects against weathering and UV induced decomposition. The insecticide may be incorporated into the structure and may be combined with chemicals or copolymers that regulate its migration, protect it against weathering and especially against UV light. To improve the latter effect, some of these chemicals may migrate to the surface as the insecticide and thus reduce UV inactivation of the insecticide already on the surface. The gradual migration to the surface of insecticide aims at rendering the protection effective for months, preferably years for the insecticides. In case that insect repellents are advantageous in connection with the invention and incorporated in the structure, these repellents may stay effective for months by this method.

Further, for insect that are attracted to pheromones like beetles and moths, pheromone or lure chemical may be integrated as part of the structure or coated to the surface as described above. Since the effect of repellent, lures and pheromones are based on evaporation of the active material and therefore a more rapid release of active material than that of insecticides, which may work by contact only, the net or laminate may be constructed in a way that the part embodying these materials are replaceable or may be retreated with intervals.

In still another development of the invention the structure of the fencing may be desired to be attracting to certain insects. Visible colours may act attracting on certain insects and be used as a colour for the structure of the fencing. For example, yellow is attractive for certain beetles, flies and aphids.

In case that the main intention is to kill insects, it may be of advantage that the structure of fencing according to the invention is black, because black is invisible for a large number of insects. This kind of insects will be prevented from seeing the structure, for instance the mesh, and fly directly into it, whereby insecticide is transferred to the insect, which then is killed.

A number of advantages are achieved by a fencing according to the invention. Being used as a fencing surrounding cattle grassing units, stressing of the cattle due to insect bites is omitted as well as potential diseases vectored by these insects to the animals. The result is higher milk and meet production, the effect of which may be most pronounced in tropical and subtropical regions. The reduction of disease vectors generally improves the health situation in especially tropic countries with reduced need for drugs, which also has a positive impact on the economy. But not only in tropic countries, a fencing according to the invention is advantageous. Also in more temperate climatic zones, such a fencing finds application, for example in crop protection against low flying or ground crawling or hopping insects.

Disease that may be prevented by using a fencing according to the invention include trypanosomiasis (sleeping sickness) as transferred by tsetse flies, a number of diseases transferred by ticks: east coast fever, cowdriosis, anaplasmosis, babesiosis, dermatophilosis (streptotrichosis), secondary skin infection, malaria, leishmaniasis, dengue, filariasis, elephantiasis and onchocerciasis and other forms of trypanosomiasis, mastitis, and blow fly infections on sheep and cattle. Furthermore, prevented may be anaemia/haematocrit induced by stomoxys, tabanids, laekatoplajohs and PCV.

Table 1 lists a number of important mosquito born viral diseases of humans and corresponding known vectors, and table 2 lists a number of human pathogens mechanically transmitted by houseflies and their relatives. These and further diseases may be prevented or at least reduced for humans and animals surrounded at least in part by the fencing according to the invention.

TABLE 1

| Virus | Geographic Distribution | Vectors |
|---|---|---|
| Alphaviruses | | |
| Chikungunya | Africa, Asia | *Aedes aegypti*, other *Aedes* species |
| Eastern equine encephalitis | North America, South America | *Culiseta melanura, Aedes taeniorhynchus, Aedes sollicitans* |
| O'nyong-nyong | Africa | *Anopheles funestus, Anopheles gambiae, Mansonia spp* |
| Ross River | Australia, Pacific Islands | *Culex annulirostris, Aedes vigilax, Aedes polynesiensis, Aedes aegypti* |
| Sindbis | Africa, Asia, Australia, Europe | *Culex univitatus, Culex tritaeniorhynchus* |
| Venezuelan equine encephalitis | North and South America | *Culex melanacom* species, *Psorophora confinnis* |
| Western equine encephalitis | Noth and Sout America | *Culex tarsalis*, *Aedes* species |
| Flaviviruses | | |
| Japanese encephalitis | Asia, New Guinea | *Culex tritaeniorhynchus* group, *Culex annulirostris, Culex annulus* |
| Murray Valley encephalitis | Australia, New Guinea | *Culex annulirostris, Culex bitaeniorhynchus* |
| Rocio | South America | *Aedes scapularis* |
| St. Louis encephalitis | North and South Amrica | *Culex pipiens* complex, *Culex tarsalis, Culex nigripalpus, Culex restuans, Culex salinarius* |
| West Nile | Africa, Asia, Europe | *Culex univittatus, Culex vishnui* subgroup |
| Dengue | Tropicopolitan | *Aedes aegypti, Aedes albopictus, Aedes polynesiensis, Aedes hensilli, Aedes scutellaris* complex |
| Yellow fever | Africa | *Aedes aegypti, Aedes africanus, Aedes simpsoni, Aedes furcifer-taylori* |
| | Americas | *Aedes aegypti, Hamagogus janthinomys, Haemagogus spegazzinit, Haemagogus leucocelaenus, Sabethes clilo-* |

TABLE 1-continued

| Virus | Geographic Distribution | Vectors |
|---|---|---|
| Zika | Africa, Asia | ropterus Aedes aegypti, Aedes africanus |
| Bunyaviruses | | |
| La Crosse | North America | Aedes triseriatus |
| Tahyna | Africa, Asia, Europe | Aedes vexans |
| Oropouche Phleboviruses | South America | Culex species |
| Rift Valley Fever | Africa | Culex pipiens complex, Aedes species |

TABLE 2

| Agent | Classification | Source |
|---|---|---|
| Virus | Poliomyelitis | Feeces |
| | Coxsackievirus | Feeces |
| | hapatitis A | Feeces |
| | Enteroviruses | Feeces |
| Reckettsia Bacterium | Coxiella burnetti | Milk |
| | Chiamydia trachomatis | Conjunctiva |
| | Shigella species | Feeces |
| | Salmonella species | Feeces |
| | Salmonella typhi | Feeces |
| | Escherichia coli | Feeces |
| | Vibrio cholerae | Feeces |
| | Helicobactor pylon | Feeces |
| | Bacterial conjunctivitis | Conjunctiva |
| Spirochete | Treponema perlenue | Skin ulcers |
| Protozoon | Entamoeba histolytica | Feeces |
| Cestode (eggs) | Taenia solium | Feeces |
| | Dipylidium caninum | Feeces |
| | Diphyllobothnium latum | Feeces |
| Nematode (eggs) | Ascaris lumbnicoides | Feeces |
| | Trichunis trichiura | Feeces |
| | Enterobius vermiscularis | Feeces |

The present invention relates to but is not limited to the following active insecticides selected from the group comprising pyrethroid compounds such as Ethofenprox: 2-(4-ethoxyphenyl)-2-methylpropyl-3-phenoxybenzyl ether, Fenvalerate: (RS)-alpha-cyano-3-phenoxybenzyl (RS)-2-(4-chlorophenyl)-3methylbutyrate, Esfenvalerate: (S)-alpha-cyano-3-phenoxybenzyl(S)-2-(4-chlorophenyl)-3-methylbutyrate, Fenpropathrin: (RS)-alpha-cyano-3-phenoxybenzyl 2,2,3,3-tetramethylcyclopropanecarboxylate, Cypermethrin: (RS)-alpha-cyano-3-phenoxybenzyl (1RS)-cis, trans-3-(2,2-dichlorovinyl)-2,2-dimethylcyclopropanecarboxylate, Permethrin: 3-phenoxybenzyl (1RS)-cis,trans-3-(2,2-dichlorovinyl)-2,2-dimethylcyclopropanecarboxylate, Cyhalothrin: (RS)-alpha-cyano-3-phenoxybenzyl(Z)-(1RS)-cis-3-(2-chloro-3,3,3-trifluoroprop-1-enyl)-2,2-dimethylcyclopro panecarboxylate, Deltamethrin: (S)-alpha-cyano-3-phenoxybenzyl (1R)-cis-3-(2,2-dibromovinyl)-2,2-dimethylcyclopropanecarboxylate, Cyclopothrin: (RS)-alpha-cyano-3-phenoxybenzyl (RS)-2,2-dichloro-1-(4-ethoxyphenyl)cyclopropanecarboxylate, Fluvalinate (alpha-cyano-3-phenoxybenzyl N-(2-chloro-alpha,alpha,alpha-trifluoro-p-tolyl)-D-valinate), Bifenthrin: (2-methylbiphenyl-3-ylmethyl)0(Z)-(1 RS)-cis-3-(2-chloro-3,3,3-trifluoro-1-propenyl)-2,2-dimethylcyclopropanecarboxylate, 2-methyl-2-(4-bromodifluoromethoxyphenyl)propyl (3-phenoxybenzyl) ether, Tralomethrin: (S)-alpha-cyano-3-phenoxybenzyl (1R-cis) 3((1RS)(1,2',2',2'-tetrabromoethyl))-2,2-dimethylcyclopropanecarboxylate, Silafluofen: 4-ethoxyphenyl (3-(4-fluoro-3-phenoxyphenyl)propyl}dimethylsilane, D-fenothrin: 3-phenoxybenzyl (1R)-cis, trans)-chrysanthemate, Cyphenothrin: (RS)-alpha-cyano-3-phenoxybenzyl (1R-cis, trans)-chrysanthemate, D-resmethrin: 5-benzyl-3-furylmethyl (1R-cis, trans)-chrysanthemate, Acrinathrin: (S)-alpha-cyano-3-phenoxybenzyl (1R-cis (Z))-(2,2-dimethyl-3-(oxo-3-(1,1,1,3,3,3-hexafluoropropyloxy)propenyl(cyclopropanecarboxylate, Cyfluthrin: (RS)-alpha-cyano-4-fluoro-3-phenoxybenzyl 3-(2,2-dichlorovinyl)-2,2-dimethylcyclopropanecarboxylate, Tefluthrin: 2,3,5,6-tetrafluoro-4-methylbenzyl (1RS-cis (Z))-3-(2-chloro-3,3,3-trifluoroprop-1-enyl)-2,2-dimethylcyclopropanecarbo xylate, Transfluthrin: 2,3,5,6-tetrafluorobenzyl (1R-trans)-3-(2,2-dichlorovinyl)-2,2-dimethylcyclopropanecarboxylate, Tetramethrin: 3,4,5,6-tetrahydrophthalimidomethyl (1RS)-cis, transchrysanthemate, Allethrin: (RS)-3-allyl-2-methyl-4-oxocyclopent-2-enyl (1RS)-cis, transchrysanthemate, Prallethrin: (S)-2-methyl-4-oxo-3-(2-propynyl)cyclopent-2-enyl (1R)-cis, transchrysanthemate, Empenthrin: (RS)-1-ethynyl-2-methyl-2-pentenyl (1R)-cis,trans-chrysanthemate, Imiprothrin: 2,5-dioxo-3-(prop-2-ynyl)imidazolidin-1-ylmethyl (1R)-cis, trans-2,2-dimethyl-3-(2-methyl-1-propenyl)-cyclopropanecarboxylate, D-flamethrin: 5-(2-propynyl)-furfuryl (1R)-cis, trans-chrysanthemate, and 5-(2-propynyl)furfuryl 2,2,3,3-tetramethylcyclopropanecarboxylate;

The presently preferred pyrethroid includes deltamethrin, etofenprox, alfacypermethrin, lambdacyhalothrin, and cyfluthrin.

Other active insecticides that may be used alone or in combination, but preferably not mixed with pyretrhoids, are e.g. carbamate compounds such as Alanycarb: S-methyl-N[[N-methyl-N—[N-benzyl-N(2-ethoxy-carbonylethyl) aminothio]carbamoyl]thioacetimidate, Bendiocarb: 2,2-dimethyl-1,3-benzodioxol-4yl-methylcarbamate), Carbaryl (1-naphthyl N-methylcarbamate, Isoprocarb: 2-(1-methylethyl) phenyl methylcarbamate, Carbosulfan: 2,3 dihydro-2,2-dimethyl-7-benzofuranyl [(dibutylamino)thio]methylcarbamate, Fenoxycarb: Ethyl[2-(4-phenoxyphenoxy)ethyl]carbamate, Indoxacarb: Methyl-7-chloro-2,3,4a,5-tetrahydro-2-[methoxycarbonyl(-4-trifluoromethoxyphenyl)]

Propoxur: 2-isopropyloxyphenol methylcarbamate,

Pirimicarb: 2-dimethylamino-5,6-dimethyl-4-pyrimidinyl-dimethylcarbamate, Thidiocarb: Dimethyl N,N' (thiobis((methylimino)carbonoyloxy)bisethanimidiothioate), Methomyl: S-methyl N-((methylcarbamoyl)oxy)thioacetamidate, Ethiofencarb: 2-((ethylthio)methyl)phenyl methylcarbamate, Fenothiocarb: S-(4-phenoxybutyl)-N,N-dimethyl thiocarbamate, Cartap: S,S'-(2-5dimethylamino)trimethylene)bis(thiocarbamate)hydrochloride, Fenobucarb: 2-sec-butylphenyl-methyl carbamate, 3,5-dimethylphenyl-methyl carbamate, Xylylcarb: 3,4-dimethylphenylmethylcarbamate, Additionally, active insecticides such as organophosphorous compounds may be applied in accordance with the invention including compounds such as Fenitrothion: O,O-dimethyl 0-(4-nitro-m-tolyl) phosphorothioate, Diazinon: 0,0-diethyl-0-(2-isopropyl-6-methyl-4-pyrimidinyl) phosphorothioate, Pyridaphenthion: 0-(1,6-dihydro-6-oxo-1-phenylpyrazidin-3-yl) 0,0-diethyl phosphorothioate, Pirimiphos-Etyl: 0,0-diethyl 0-(2-(diethylamino) 6-methyl-pyrimidinyl) phosphorothioate, Pirimiphos-Methyl: 0-[2-(diethylamino)-6-methyl-4pyrimidinyl]0,0-dimethyl phosphorothioate, Etrimphos: 0-6-ethoxy-2-ethyl-pyrimidin-4-yl-0,0-dimethyl-phosphorothioate, Fenthion: 0,0-dimethyl-0-[-3-methyl-4-(methylthio) phenyl phosphorothioate, Phoxim: 2-(diethoxyphosphinothoyloxyimino)-2-phenylacetonitrile, Chlorpyrifos: 0,0-diethyl-0-(3,5,6-trichloro-2-pyrinyl) phosphorothioate, Chlorpyriphos-methyl: 0,0-dimethyl 0-(3,5,6-trichloro-2-pyridinyl) phosphorothioate, Cyanophos: 0,0-dimethyl 0-(4cyanophenyl) phosphorothioate, Pyraclofos: (R,S)[4-chlorophenyl)-pyrazol-4-yl]-O-ethyl-S-n-propyl phosphorothioate, Acephate: 0,S-dimethyl acetylphosphoroamidothioate, Azamethiphos: S-(6-chloro-2,3-dihydro-oxo-1,3-oxazolo [4,5-b]pyridin-3-ylmethyl phosphorothioate, Malathion: 0,0-dimethyl phosphorodithioate ester of diethyl mercaptosuccinate, Temephos: (0,0'(thiodi-4-1-phenylene) 0,0,0,0-tetramethyl phosphorodithioate, Dimethoate: ((0,0-dimethyl S-(n-methylcarbamoylmethyl) phosphorodithioate, Formothion: S[2-formylmethylamino]-2-oxoethyl]-O,O-dimethyl phosphorodithioate, Phenthoate: 0,0-dimethyl S-(alpha-ethoxycarbonylbenzyl)-phosphorodithioate.

In addition, especially for ticks and mites, the following insecticides may be applied:

neonicotioids as acetamidiprid and imidacloprid: 1-(6-chloro-3-pyridylmethyl)-N-nitro-2-imidazolidinimine;

pyridins as pyriproxyfen: 2-[1-+methyl-2-(4-phenoxyphenoxy)ethoxyy]pyridine;

pyrimidines as pyremidifen 5-chloro-N-(2,-[4-(2-ethoxyethyl)-2,3-dimethyl-phenoxy]-ethyl)6-ethylpyrimid in-4-amin quinazoliner as fenazaquin: 4-[[-(1,1-dimethylethyl)phenyl, pyrazoler and phenyl pyrazoles as dihydropyrazole, fipronile, tebufenpyrad, and fenpyroproximate: 1,1-dimethylethyl-4-[[[[(1,3-dimethyl-5-phenoxy-1H-pyrazol-4-yl)-methylene]ammo] oxy]methyl]benzoate]

pyrazoner as tebufenpyrad, carbonitrils as vaniliprol, hydrazins as tebufenozide, hydrazons, azomethins, diphenyls as bifenazate benzoylurea and derivatives thereof.

Furthermore active insecticides with a sterilising effect on adult mosquitoes and/or with a growth regulating effect may applied such as:

(alfa-4-(chloro-alpha-cyclopropylbenzylidenamino-oxy)-p-tolyl)-3-(2,6-diflourobenzoyl)urea, Diflubenzuron: N-(((3,5-dichloro-4-(1,1,2,2-tetraflouroethoxy)phenylamino) carbonyl)2,6 diflouro benzamid, Triflumuron: 2-Chloro-N-(((4-(triflouromethoxy) phenyl)-amino-)carbonyl) benzamide, or a triazin such as N-cyclopropyl-1,3,5-triazine-2,4,6-triamin.

A fencing according to the invention implies a large variety of applications. Examples are a cattle field, an agricultural area, a village, a refugee camp, a children playground, a sports ground, stadium, a swimming pool, a market place and any private or public building, such as a hospital or a school.

A fencing according to the invention may protect different kinds of agricultural plants from insects. Table 3 below shows a number crops which may be subject to damage due to certain insects.

TABLE 3

| Insect | Common name | Crop |
| --- | --- | --- |
| Helicoverpa (Heliothis) armigera | American boliworm, fruit/pod borer, | Cotton, Gram, Pigeon Pea, Tomato, Chilies, Tobacco etc. |
| Spodoptera litura | Tobacco caterpillar | Cotton, Cauliflower, Cabbage, Green Gram, Black Gram, Chillies, Tobacco etc. |
| Erlas vitella | Spotted Bollworm | Cotton, Lady finger |
| Erlas insulana | Spiny Boliworm | Cotton, Lady finger |
| Pectinophora gossypiella | Pink Bollwonn | Cotton |
| Scirpophaga incertuias | Yellow Stemborer | Paddy (Rice) |

DETAILED DESCRIPTION/PREFERRED EMBODIMENT

The invention will be explained in more detail in the following with reference to the drawings, where.

Figure 1:
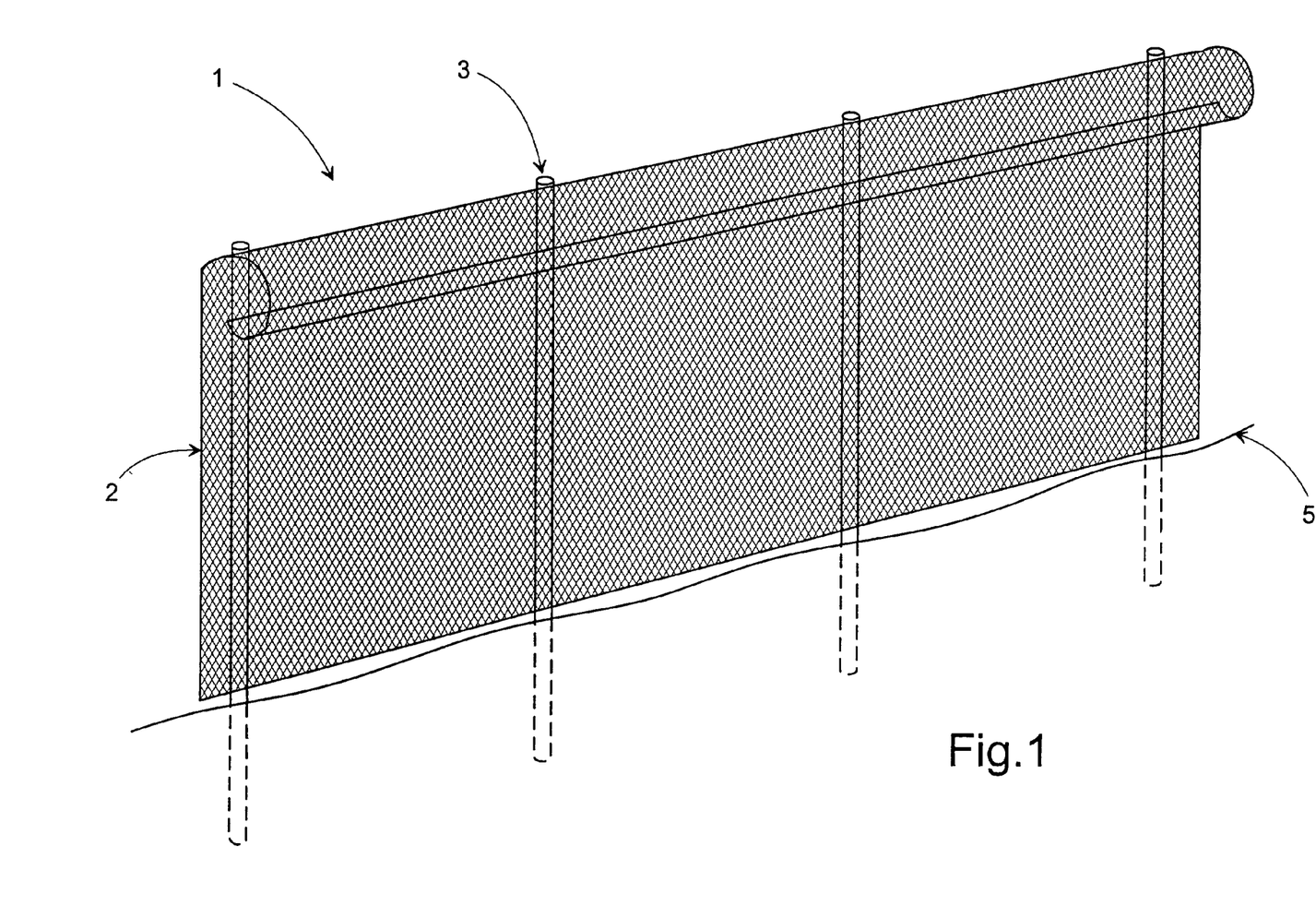
FIG. 1 shows a fencing according to the invention in a perspective view.

The preferred embodiment of the invention is, as shown in FIG. 1. A fencing 1 with a mesh structure 2 which is attached to rigid, substantially upright support members 3 to which the mesh 2, preferably a stiff net, is attached. The size of the openings in the mesh may be chosen to prevent certain insects to traverse the fencing 1, while smaller insects have the possibility to move through the mesh openings. The size of the openings in the mesh may alternatively be chosen to prevent almost any insect to traverse the mesh.

An insect 4, which is crawling on the ground surface 5 may pass the fencing, because the lower edge of the mesh is located at a certain height above the ground.

Figure 2:
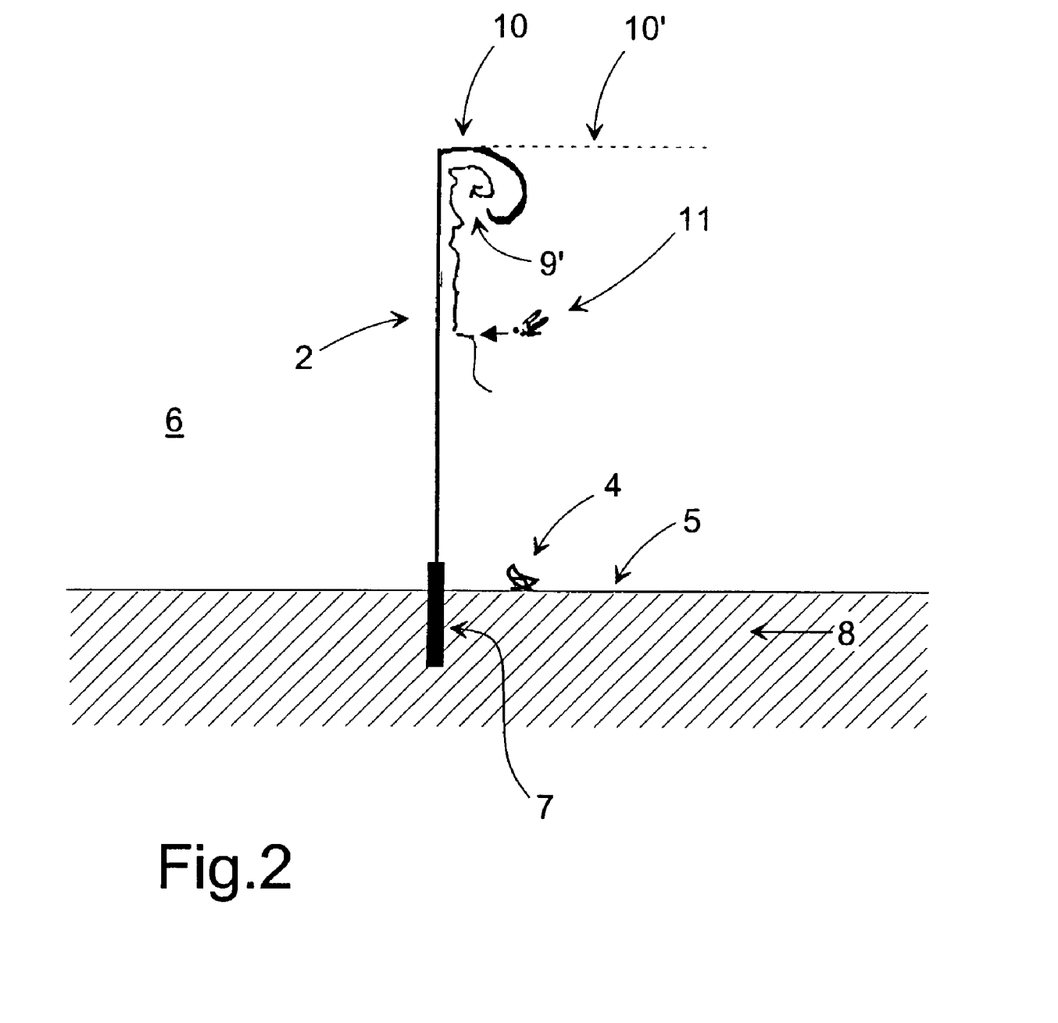
FIG. 2 shows the fencing in a cross sectional view.

Alternatively, for prevented crawling insects from entering the open area, the fencing structure 2 may extend onto the ground surface 5 or into the ground as shown in FIG. 2. As a safety arrangement, the ground part 7 of the fencing structure may extend into the ground a certain distance, for example 0.2 m, below the ground surface. This way, also those insects that traverse the top soil 8 under the ground surface 5 are prevented from reaching the open area 6.

The mesh 2 as well as the ground part 7, which for example may be a tarpaulin attached to the mesh 2, may be impregnated with an insecticide, which is transferred to an insect that touches the mesh 2 or the ground part 7. This reduces the number of insects around the open area 6 that is desired free from nuisance insects.

If the mesh 2 does not comprise an insecticide, or in case a flying insect 11 is resistant to the insecticide, this insect 11 may after having approached the mesh 2, which is indicated by trajectory 9, move unaffected upwards along the surface of the mesh 2, which is indicated with trajectory 9', in order to get around the obstacle. In this case, it is of advantage to provide the fencing structure with a top part 10' which is bent away from the open area 6 and preferably a top part 10 which is bent downwards in order to trap these insects 11 which then, after a while, die due to exhaustion.

Preferably, this top part is impregnated with an insecticide to kill the insect 11. It may alternatively be treated with or having attached to it an object or structure that release pheromones thus making the top part into a trap for the species lured to the used chemical. This trap may work with or without supplementary insecticides In case that the mesh 2 is impregnated with a certain insecticide, the insecticide for the top part 10 or 10' is preferably different from the insecticide which is used for the mesh 2. Thus, an insect 11 which may be resistant to the insecticide of the mesh, for example a pyrethroid, would in this case be killed by the insecticide of the top part 10, for example an organophosphate based insecticide. In areas with resistance to both of these traditionally used insecticides, new insecticides can with economic advantage be used with the fence, since the more limited application of these often more expensive chemicals can make these affordable for more crops or other areas to be protected.

The invention claimed is:

1. A fencing for preventing low-flying insects from entering an open air area comprising a substantially upright structure at least partly surrounding said area, said structure having a height suitable for preventing the low-flying insects from entering said open-air area, wherein at least part of said structure is provided with an insecticide transferable to said low flying insects touching said at least part of said structure, wherein said insecticide is provided within said at least part of said structure by impregnating or incorporating said insecticide in a material of said at least part of said structure for gradual migration of said insecticide from an interior of said at least part of said structure through the material to surfaces of said at least part of said structure for long lasting insecticidal efficiency of said at least part of said structure, wherein said insecticide is selected from the group consisting of a pyrethroid based insecticide, an organophosphorus based insecticide, a carbamate based insecticide, an insecticide affecting ticks or mites, an insecticide with a sterilizing effect or growth regulating effect on insects or acarides, and combinations thereof.

2. A fencing according to claim 1, wherein said insecticide further comprises pyrethroid compounds selected from the group consisting of:
   Ethofenprox: 2-(4-ethoxyphenyl)-2-methylpropyl-3-phenoxybenzyl ether,
   Fenvalerate: (RS)-alpha-cyano-3-phenoxybenzyl (RS)-2-(4-chlorophenyl)-3 methylbutyrate,
   Esfenvalerate: (S)-alpha-cyano-3-phenoxybenzyl(S)-2-(4-chlorophenyl)-3-methylbutyrate,
   Fenpropathrin: (RS)-alpha-cyano-3-phenoxybenzyl 2,2,3,3-tetramethylcyclopropanecarboxylate,
   Cypermethrin: (RS)-alpha-cyano-3-phenoxybenzyl (1RS)-cis, trans-3-(2,2-dichlorovinyl)-2,2-dimethylcyclopropanecarboxylate,
   Permethrin: 3-phenoxybenzyl (1RS)-cis, trans-3-(2,2-dichlorovinyl)-2,2-dimethylcyclopropanecarboxylate,
   Cyhalothrin: (RS)-alpha-cyano-3-phenoxybenzyl(Z)-(1RS)-cis-3-(2-chloro-3,3,3-trifluoroprop-1-enyl)-2,2-dimethylcyclopro panecarboxylate,
   Deltamethrin: (S)-alpha-cyano-3-phenoxybenzyl (1R)-cis-3-(2,2-dibromovinyl)-2,2-dimethylcyclopropanecarboxylate,
   Cycloprotbrin: (RS)-alpha-cyano-3-phenoxybenzyl (RS)-2,2-dichloro-1-(4-ethoxyphenyl)cyclopropanecarboxylate,
   Fluvalinate (alpha-cyano-3-phenoxybenzyl N-(2-chloro-alpha,alpha,alpha-trifluoro-p-tolyl)-D-valinate),
   Bifenthrin: (2-methylbiphenyl-3-ylmethyl)0(Z)-(1RS)-cis-3-(2-chloro-3,3,3-trifluoro-1-propenyl)-2,2-dimethylcyclopropanecarboxylate,
   2-methyl-2-(4-bromodifluoromethoxyphenyl)propyl (3-phenoxybenzyl)ether,
   Tralomethrin: (S)-alpha-cyano-3-phenoxybenzyl (1R-cis) 3((1'RS)(1',2',2',2'-tetrabromoethyl))-2,2-dimethylcyclopropanecarboxylate,
   Silafluofen: 4-ethoxyphenyl (3-(4-fluoro-3-phenoxyphenyl)propyl}dimethylsilane,
   D-fenothrin: 3-phenoxybenzyl (1R)-cis, trans)-chrysanthemate,
   Cyphenothrin: (RS)-alpha-cyano-3-phenoxybenzyl (1R-cis, trans)-chrysanthemate, D-resmethrin: 5-benzyl-3-furylmethyl (1R-cis, trans)-chrysanthemate,
   Acrinathrin: (S)-alpha-cyano-3-phenoxybenzyl (1R-cis (Z))-(2,2-dimethyl-3-(oxo-3-(1,1,1,3,3,3-hexafluoropropyloxy)propenyl(cyclopropanecarboxylate,
   Cyfluthrin: (RS)-alpha-cyano-4-fluoro-3-phenoxybenzyl 3-(2,2-dichlorovinyl)-2,2-dimethylcyclopropanecarboxylate,
   Tefluthrin: 2,3,5,6-tetrafluoro-4-methylbenzyl (1RS-cis (Z))-3-(2-chloro-3,3,3-trifluoroprop-1-enyl)-2,2-dimethylcyclopropanecarbo xylate,
   Transfluthrin: 2,3,5,6-tetrafluorobenzyl (1R-trans)-3-(2,2-dichlorovinyl)-2,2-dimethylcyclopropanecarboxylate,
   Tetramethrin: 3,4,5,6-tetrahydrophthalimidomethyl (1RS)-cis, trans-chrysanthemate,
   Allethrin: (RS)-3-allyl-2-methyl-4-oxocyclopent-2-enyl (1RS)-cis, trans-chrysanthemate,
   Prallethrin: (S)-2-methyl-4-oxo-3-(2-propynyl)cyclopent-2-enyl (1R)-cis, trans-chrysanthemate,
   Empenthrin: (RS)-1-ethynyl-2-methyl-2-pentenyl (1R)-cis,trans-chrysanthemate,
   Imiprothrin: 2,5-dioxo-3-(prop-2-ynyl)imidazolidin-1-ylmethyl (1R)-cis, trans-2,2-dimethyl-3-(2-methyl-1-propenyl)-cyclopropanecarboxylate,
   D-flamethrin: 5-(2-propynyl)-furfuryl (1R)-cis, trans-chrysanthemate, and 5-(2-propynyl)furfuryl 2,2,3,3-tetramethylcyclopropanecarboxylate;
   deltamethrin,
      etofenprox,
      alfacypermethrin,
      lambdacyhalothrin,
      cyfluthrin, and
      combinations thereof.

3. A fencing according to claim 1, wherein said insecticide further comprises carbamate compounds selected from the group consisting of:

Alanycarb: S-methyl-N[[N-methyl-N—[N-benzyl-N(2-ethoxy-carbonylethyl)aminothio]carbamoyl]thioacetimidate,
Bendiocarb: 2,2-dimethyl-1,3-benzodioxol-4-yl-methylcarbamate),
Carbaryl (1-naphthyl N-methylcarbamate,
Isoprocarb: 2-(1-methylethyl)phenyl methylcarbamate,
Carbosulfan: 2,3 dihydro-2,2-dimethyl-7-benzofuranyl [(dibutylamino)thio]methylcarbamate,
Fenoxycarb: Ethyl[2-(4-phenoxyphenoxy)ethyl]carbamate,
Indoxacarb: Methyl-7-chloro-2,3,4a,5-tetrahydro-2-[methoxycarbonyl(-4-trifluoromethoxyphenyl)]
Propoxur: 2-isopropyloxyphenol methylcarbamate,
Pirimicarb: 2-dimethylamino-5,6-dimethyl-4-pyrimidinyl-dimethylcarbamate, Thidiocarb: Dimethyl N,N' (thiobis((methylimino)carbonoyloxy)bisethanimidiothioate),
Methomyl: S-methyl N-((methylcarbamoyl)oxy)thioacetamidate,
Ethiofencarb: 2-((ethylthio)methyl)phenyl methylcarbamate,
Fenothiocarb: S-(4-phenoxybutyl)-N,N-dimethyl thiocarbamate,
Cartap: S,S'-(2-5-dimethylamino)trimethylene)bis(thiocarbamate)hydrochloride, Fenobucarb: 2-sec-butylphenylmethyl carbamate, 3,5-dimethylphenyl-methyl carbamate,
Xylylcarb: 3,4-dimethylphenylmethylcarbamate, and combinations thereof.

4. A fencing according to claim 1, wherein said insecticide further comprises organophosphorous compounds selected from the group consisting of:
Fenitrothion: O,O-dimethyl 0-(4-nitro-m-tolyl) phosphorothioate,
Diazinon: O,O-diethyl-0-(2-isopropyl-6-methyl-4-pyrimidinyl) phosphorothioate,
Pyridaphenthion: 0-(1,6-dihydro-6-oxo-1-phenylpyrazidin-3-yl) 0,0-diethyl phosphorothioate,
Pirimiphos-Etyl: 0,0-diethyl 0-(2-(diethylamino) 6-methyl-pyrimidinyl) phosphorothioate,
Pirimiphos-Methyl: 0[2-(diethylamino)-6-methyl-4-pyrimidinyl]0,0-dimethyl phosphorothioate,
Etrimphos: 0-6-ethoxy-2-ethyl-pyrimidin-4-yl-0,0-dimethyl-phosphorothioate,
Fenthion: 0,0-dimethyl-0[-3-methyl-4-(methylthio) phenyl phosphorothioate,
Phoxim: 2-(diethoxyphosphinothoyloxyimino)-2-phenylacetonitrile,
Chlorpyrifos: 0,0-diethyl-O-(3,5,6-trichloro-2-pyrinyl) phosphorothioate,
Chlorpyriphos-methyl: 0,0-dimethyl 0-(3,5,6-trichloro-2-pyridinyl) phosphorothioate,
Cyanophos: 0,0-dimethyl 0-(4-cyanophenyl) phosphorothioate,
Pyraclofos: (R,S)[4-chlorophenyl)-pyrazol-4-yl]-0-ethyl-S-n-propyl phosphorothioate, Acephate: 0,S-dimethyl acetylphosphoroamidothioate,
Azamethiphos: S-(6-chloro-2,3-dihydro-oxo-1,3-oxazolo [4,5-b]pyridin-3-ylmethyl phosphorothioate,
Malathion: 0,0-dimethyl phosphorodithioate ester of diethyl mercaptosuccinate,
Temephos: (0,0'(thiodi-4-1-phenylene) 0,0,0,0-tetramethyl phosphorodithioate,
Dimethoate: ((0,0-dimethyl S-(n-methylcarbamoylmethyl) phosphorodithioate,
Formothion: S[2-formylmethylamino]-2-oxoethyl]-O,O-dimethyl phosphorodithioate,
Phenthoate: 0,0-dimethyl S-(alpha-ethoxycarbonylbenzyl)-phosphorodithioate, and
combinations thereof.

5. A fencing according to claim 1, wherein said insecticide further comprises insecticide affecting ticks or mites selected from the group consisting of:
neonicotioids as acetamidiprid and imidacloprid: 1-(6-chloro-3-pyridylmethyl)-N-nitro-2-imidazolidinimine;
pyridins as pyriproxyfen: 2-[1-+methyl-2-(4-phenoxyphenoxy)ethoxyy]pyridine;
pyrimidines as pyremidifen 5-chloro-N-(2,-[4-(2-ethoxyethyl)-2,3-dimethyl-phenoxy]-ethyl)-6-ethylpyrimidin-4-amin
quinazoliner as fenazaquin: 4-[[-(1,1-dimethylethyl)phenyl, pyrazoler and phenyl
pyrazoles as dihydropyrazole, fipronile, tebufenpyrad, and fenpyroproximate: 1,1-dimethyl ethyl-4-[[[[(1,3-dimethyl-5-phenoxy-1H-pyrazol-4-yl)-methylene]ammo] oxy]methyl]benzoate]
pyrazoner as tebufenpyrad,
carbonitrils as vaniliprol,
hydrazins as tebufenozide,
hydrazons,
azomethins,
diphenyls as bifenazate,
benzoylurea and derivatives thereof, and
combinations thereof.

6. A fencing according to claim 1, wherein said insecticide with a sterilizing or growth regulating effect further comprises insecticide affecting ticks or mites selected from the group consisting of:
(alfa-4-(chloro-alpha-cyclopropylbenzylidenamino-oxy)-p-tolyl)-3-(2,6-difluorobenzoyl)urea,
Diflubenzuron: N-(((3,5-dichloro-4-(1,1,2,2-tetrafluoroethoxy)phenylamino) carbonyl)2,6 difluoro benzamid,
Triflumuron: 2-Chloro-N-(((4-(trifluoromethoxy)phenyl)-amino-)carbonyl)benzamide,
a triazin such as N-cyclopropyl-1,3,5-triazine-2,4,6-triamin, and
combinations thereof.

7. A fencing for preventing low-flying insects from entering an open air area comprising a substantially upright structure at least partly surrounding said area, said structure having a height suitable for preventing the low-flying insects from entering said open-air area, wherein at least part of said structure is provided with an insecticide transferable to said low flying insects touching said at least part of said structure, wherein said insecticide is provided within said at least part of said structure by impregnating or incorporating said insecticide in a material of said at least part of said structure for gradual migration of said insecticide from an interior of said at least part of said structure through the material to surfaces of said at least part of said structure for long lasting insecticidal efficiency of said at least part of said structure, wherein said structure is a net made of polymer fibers with the insecticide incorporated in said polymer fibers for the gradual migration of said insecticide from interiors of said fibers to surfaces of said fibers for the long lasting insecticidal efficiency of said structure.

8. A fencing for preventing low-flying insects from entering an open air area comprising a substantially upright structure at least partly surrounding said area, said structure having a height suitable for preventing the low-flying insects from entering said open-air area, wherein at least part of said structure is provided with an insecticide transferable to said low flying insects touching said at least part of said structure, wherein said insecticide is provided within said at least part of said structure by impregnating or incorporating said insecticide in a material of said at least part of said structure for gradual migration of said insecticide from an interior of said at least part of said structure through the material to surfaces of said at least part of said structure for long lasting insecticidal efficiency of said at least part of said structure, wherein said structure is a net made of polymer fibers impregnated with the insecticide for gradual migration of said insecticide from the interior of said fibers to surfaces of said fibers for the long lasting insecticidal efficiency of said structure.

9. A fencing according to claim 7, 8 or 1, wherein said structure is supported on solid ground and wherein said structure comprises a ground part extending into the ground for preventing ground crawling insects and top soil traversing insects from entering said area.

10. A fencing for preventing low-flying insects from entering an open air area comprising a substantially upright structure at least partly surrounding said area, said structure having a height suitable for preventing the low-flying insects from entering said open-air area, wherein at least part of said structure is provided with an insecticide transferable to said low flying insects touching said at least part of said structure, wherein said insecticide is provided within said at least part of said structure by impregnating or incorporating said insecticide in a material of said at least part of said structure for gradual migration of said insecticide from an interior of said at least part of said structure through the material to surfaces of said at least part of said structure for long lasting insecticidal efficiency of said at least part of said structure, wherein said structure has a lower edge positioned between about 5 cm and about 20 cm above ground, for allowing crawling insects to pass said structure.

11. A fencing according to claim 10, 7, 8 or 1, wherein said structure comprises a top part which is bent into a concave structure for trapping insects, the top part further comprising insecticide on the top part transferable to insects touching said top part.

12. A fencing according to claim 11, wherein the top part further comprises insect attractants selected from a group consisting of insect attracting agents, pheromones, insect luring agents, and combinations thereof.

13. A fencing according to claim 11, wherein the insecticide transferable from the top part is different from the insecticide provided within said at least part of the structure.

14. A fencing according to claim 10, 7, 8 or 1, further comprising rigid, substantially upright frame members, on which said structure is attached.

15. A fencing according to claim 10, 7, 8 or 1, wherein said structure for preventing said low flying insects from entering said area comprises at least one structure selected from the group consisting of a rigid wall, a foil, a fabric, a perforated foil, a perforated laminate, and a mesh with openings of a size smaller than said insects, and combinations thereof.

16. A fencing according to claim 10, 7, 8 or 1, wherein said structure further comprises UV protective and UV resistant material to prevent decomposition of said insecticide.

17. A fencing according to claim 10, 7, 8 or 1, wherein said structure further comprises UV protective and UV resistant material for preventing decomposing of said structure due to UV radiation.

18. A fencing according to claim 10, 7, 8 or 1, wherein said structure further comprises insect attractants selected from the group consisting of insect attracting agents, insect lures, pheromones, pheromone mimics, and combinations thereof.

19. A fencing according to claim 10, 7, 8 or 1, wherein said structure has a color for attracting certain pre-selected insect pests.

20. A fencing according to claim 10, 7, 8 or 1, wherein said structure is black for being invisible for certain insects.

21. A fencing according to claim 10, 7, 8 or 1, wherein the height of the structure is between about 0.5 m and about 2 m.

* * * * *